United States Patent
Lee et al.

(10) Patent No.: US 11,085,878 B2
(45) Date of Patent: Aug. 10, 2021

(54) RADIATION DETECTION SYSTEM WITH SURFACE PLASMON RESONANCE DETECTION AND RELATED METHODS

(71) Applicant: Eagle Technology, LLC, Melbourne, FL (US)

(72) Inventors: Susanne M. Lee, Cocoa, FL (US); Madison A. Young, Charlotte, NC (US); Erin K. Sharma, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 136 days.

(21) Appl. No.: 16/444,128

(22) Filed: Jun. 18, 2019

(65) Prior Publication Data

US 2020/0400564 A1    Dec. 24, 2020

(51) Int. Cl.
*G01N 21/552*     (2014.01)

(52) U.S. Cl.
CPC ..... *G01N 21/554* (2013.01); *G01N 2201/061* (2013.01); *G01N 2201/088* (2013.01)

(58) Field of Classification Search
CPC .......... G01N 21/554; G01N 2201/061; G01N 2201/088
USPC ........................................ 326/356, 432–448
See application file for complete search history.

(56) References Cited

U.S. PATENT DOCUMENTS

| | | | |
|---|---|---|---|
| 5,047,213 A * | 9/1991 | Finlan | G01N 21/553 422/82.11 |
| 5,478,755 A | 12/1995 | Attridge et al. | |
| 5,991,048 A | 11/1999 | Karlson et al. | |
| 7,177,515 B2 | 2/2007 | Estes et al. | |
| 7,928,386 B2 | 4/2011 | Frey et al. | |
| 8,376,013 B2 | 2/2013 | Bourke, Jr. et al. | |
| 2002/0164604 A1 | 11/2002 | Abbott et al. | |
| 2003/0096310 A1 | 5/2003 | Hansen et al. | |
| 2005/0270538 A1 | 12/2005 | Meehan et al. | |
| 2006/0209413 A1 | 9/2006 | Kim et al. | |
| 2006/0273245 A1 | 12/2006 | Kim et al. | |
| 2007/0082408 A1 | 4/2007 | Jing et al. | |
| 2007/0116420 A1 | 5/2007 | Estes et al. | |
| 2007/0153283 A1 * | 7/2007 | Tsao | G01N 21/7703 356/445 |
| 2007/0190638 A1 | 8/2007 | Hyde | |
| 2008/0135739 A1 | 6/2008 | Kim et al. | |
| 2008/0212102 A1 | 9/2008 | Nuzzo et al. | |

(Continued)

OTHER PUBLICATIONS

Kunieda et al. "Development of an X-ray detector using surface plasmon resonance" Spectrochimica Acta—Part B Atomic Spectroscopy 64(8), 744-746 (2009). pp. 3.

(Continued)

*Primary Examiner* — Tri T Ton
(74) *Attorney, Agent, or Firm* — Allen, Dyer, Dopelt + Gilchrist, P.A. Attorneys at Law

(57) ABSTRACT

A radiation detection system may include a radiation source, and a surface plasmon resonance (SPR) radiation detector. The SPR radiation detector may include a structure, a surface plasmon support material on portions of the structure and configured to receive radiation from the radiation source that initiates a surface plasmon at an interface between the structure and the surface plasmon support material, and a probing device coupled to the structure and configured to detect the surface plasmon.

40 Claims, 9 Drawing Sheets

(56) References Cited

U.S. PATENT DOCUMENTS

| | | |
|---|---|---|
| 2008/0285040 A1 | 11/2008 | Fourkas et al. |
| 2009/0051920 A1 | 2/2009 | Hyde |
| 2009/0116020 A1* | 5/2009 | Wu .................. G01N 33/54373 356/445 |
| 2009/0134025 A1 | 5/2009 | Shtein et al. |
| 2009/0238236 A1 | 9/2009 | Fleury-Frenette et al. |
| 2010/0067000 A1 | 3/2010 | Baumberg et al. |
| 2011/0117202 A1 | 5/2011 | Bourke, Jr. et al. |
| 2011/0287977 A1 | 11/2011 | Cai et al. |
| 2014/0015548 A1 | 1/2014 | Naughton et al. |
| 2014/0113828 A1* | 4/2014 | Gilbert .................. H01L 39/225 505/100 |
| 2014/0358128 A1 | 12/2014 | Montazeri et al. |
| 2015/0177150 A1 | 6/2015 | Rothberg et al. |
| 2015/0338402 A1 | 11/2015 | Lakowicz et al. |
| 2016/0041095 A1 | 2/2016 | Rothberg et al. |

OTHER PUBLICATIONS

Herve et al. "Study of a possible X-ray sensor based on the Plasmon Surface Resonance for the next generation of instruments" Bulletin de la Société Royale des Sciences de Liège 80, 500-503 (2011). pp. 4.

Zhang et al. "Laser-launched evanescent surface plasmon polariton field utilized as a direct coherent pumping source to generate emitted nonlinear four-wave mixing radiation" Optics express 19(6), 4991-5001 (2011). pp. 11.

Klantsataya et al. "Plasmonic Fiber Optic Refractometric Sensors; From Conventional Architectures to Recent Design Trends" Sensors 2017, 17, 12; www.mdpi.com/journal/sensors; pp. 23.

Huang et al. "Study of plasmon resonance in a gold nanorod with an LC circuit model" Apr. 13, 2009 / vol. 17, No. 8 / Optics Express 6407; pp. 7.

Nguyen et al. "Bimetal coated optical fiber sensors based on surface plasmon resonance induced change in birefringence and intensity" Mar. 10, 2014 | vol. 22, No. 5 | DOI:10.1364/OE.22.005590 | Optics Express 5590: pp. 9.

Alessandro Mapelli "Scintillation Particle Detectors Based on Plastic Optical Fibres and Microfluidics" Thèse No. 5033 (2011) À la Faculté Sciences Et Techniques de L'Ingénieur Laboratoire de Microsystèmes 4 Rogramme Doctoral En Microsystèmes Et Microélectronique: pp. 193.

* cited by examiner

RADIATION DETECTION SYSTEM WITH SURFACE PLASMON RESONANCE DETECTION AND RELATED METHODS

TECHNICAL FIELD

The present disclosure relates to the field of detection devices, and, more particularly, to a radiation detection device and related methods.

BACKGROUND

X-ray detectors have wide usage in several fields. For example, X-ray imaging is ubiquitous in the medical imaging field. In some industrial applications, X-ray imaging, i.e. radiography, is used to verify the mechanical integrity and fidelity of components.

Once such example application is verifying the structural integrity of aboveground pipelines for transferring hydrocarbon resources. Since these pipelines span many miles, the inspection device is necessarily mobile. Indeed, since these aboveground pipes are exposed to wide environmental extremes, they are inspected regularly for leaks.

In one approach to inspecting these pipelines, personnel use mobile scintillator-based X-ray detectors to image individual pipeline joints. This approach has drawbacks since the scintillator-based X-ray detectors are quite fragile and expensive.

In another approach, a pigging device is fed through the pipeline. The pigging device may include an X-ray imaging device. Again, the expense and fragility of the scintillator-based X-ray detectors can be a problem in this approach.

SUMMARY

Generally speaking, a radiation detection system may comprise a radiation source, and a surface plasmon resonance (SPR) radiation detector comprising at least one structure, and a surface plasmon support material on portions of the at least one structure. The surface plasmon support material may be configured to receive radiation from the radiation source that initiates a surface plasmon at an interface between the at least one structure and the surface plasmon support material. The radiation detection system may comprise a probing device coupled to the at least one structure and configured to detect the surface plasmon.

For example, the at least one structure may comprise one of a ring shaped-structure, a sphere-shaped structure, a linear structure, or a plate-shaped structure. Also, the at least one structure may include a material transparent to at least one of ultraviolet (UV), visible, and infrared (IR) radiation. More specifically, the probing device may comprise a probe electromagnetic (EM) radiation source configured to emit probe EM radiation into the at least one structure. The probe EM radiation may interact with the surface plasmon and generate new EM radiation having a different wavelength than the probe EM radiation resulting from the interaction. The probing device may comprise an EM radiation detector coupled to the at least one structure and configured to detect the new EM radiation. The probing device may also include a processor configured to determine a wavelength of the new EM radiation.

For example, the probe EM radiation source may comprise at least one of a visible EM radiation source, a UV EM radiation source, and an IR EM radiation source. The EM radiation detector may comprise at least one photodiode. Also, the EM radiation detector may comprise at least one energy sensitive detector, or at least one energy integrating detector.

For example, the surface plasmon support material may comprise at least one transition metal. The surface plasmon support material may comprise at least one of gold, silver, aluminum, aluminum-silver alloy, doped semiconductors, silicon carbide, diamond, copper, copper-tungsten, and topological insulators. The radiation source may be configured to emit at least one of X-ray radiation, gamma radiation, neutron radiation, beta particle radiation, proton particle radiation, and alpha particle radiation.

In particular, the probing device may be configured to detect different radiation frequencies and intensities based upon a non-linear 4-wave/2-wave mixed beam resulting from different surface plasmon frequencies and intensities, different probe beam frequencies, and different probe beam angles at an interface between the at least one structure and the surface plasmon support material. In some embodiments, the radiation source may comprise a radiation emitter, and the radiation emitter may be configured to irradiate an object. The object may transmit or scatter the radiation, and the SPR radiation detector may be configured to detect the transmitted or scattered radiation.

Another aspect is directed to a SPR radiation detector comprising at least one structure, and a surface plasmon support material on portions of the at least one structure and configured to receive radiation from a radiation source that initiates a surface plasmon at an interface between the at least one structure and the surface plasmon support material. The SPR radiation detector may include a probing device coupled to the at least one structure and configured to detect the surface plasmon.

Yet another aspect is directed a method of operating a radiation detection system comprising a radiation source, and a SPR radiation detector. The SPR radiation detector may comprise at least one structure, a surface plasmon support material on portions of the at least one structure, and a probing device coupled to the at least one structure. The method may comprise receiving radiation at the surface plasmon support material from the radiation source that initiates a surface plasmon at an interface between the at least one structure and the surface plasmon support material, and operating the SPR radiation detector to detect the surface plasmon.

Another aspect is directed to a method for making a radiation detection system comprising positioning a radiation source, and forming a surface plasmon support material on portions of at least one structure and to receive radiation from the radiation source that initiates a surface plasmon at an interface between the at least one structure and the surface plasmon support material. The method may comprise coupling a probing device to the at least one structure and configured to detect the surface plasmon.

Another aspect is directed to a radiation detection system including a radiation source, and a SPR radiation detector. The SPR radiation detector may include at least one fiber, a surface plasmon support material on portions of the at least one fiber and configured to receive radiation from the radiation source that initiates a surface plasmon at an interface between the at least one fiber and the surface plasmon support material, and a probing device coupled to the at least one fiber and configured to detect the surface plasmon.

In some embodiments, the at least one fiber may comprise a plurality thereof arranged in a bundle, and the probing device may comprise a processor configured to generate a pixelated image based upon surface plasmon detection signals. The plurality of fibers may generate a plurality of signals, and a respective signal from each fiber may define a pixel in the pixelated image.

In some embodiments, the surface plasmon support material may be on a single end portion of the at least one fiber. Moreover, the at least one fiber may have an end face canted at a non-orthogonal angle to a longitudinal axis of the at least one fiber. Alternatively, the at least one fiber may have an end face at an orthogonal angle to the longitudinal axis of the at least one fiber. In other embodiments, the surface plasmon support material may be on sides substantially parallel to a longitudinal axis of the at least one fiber. In some embodiments, the surface plasmon support material may include a plurality of different material layers, each different material layer to absorb radiation at a different energy level.

For instance, the at least one fiber may comprise at least one of a multi-mode fiber, a single mode fiber, and a photonic crystal fiber. The at least one fiber may comprise a material transparent to at least one of UV, visible, and IR radiation. The material may comprise glass, plastic, polymer, ceramic, silicon carbide, and crystals.

Another aspect is directed to a SPR radiation detector. The SPR radiation detector may include at least one fiber, and a surface plasmon support material on portions of the at least one fiber. The surface plasmon support material may be configured to receive radiation from a radiation source that initiates a surface plasmon at an interface between the at least one fiber and the surface plasmon support material. The SPR radiation detector may comprise a probing device coupled to the at least one fiber and configured to detect the surface plasmon.

Another aspect is directed to a method of operating a radiation detection system comprising a radiation source, and a SPR radiation detector. The SPR radiation detector may include at least one fiber, a surface plasmon support material on portions of the at least one fiber, and a probing device coupled to the at least one fiber. The method may comprise receiving radiation at the surface plasmon support material from the radiation source that initiates a surface plasmon at an interface between the at least one fiber and the surface plasmon support material, and operating the SPR radiation detector to detect the surface plasmon.

Yet another is directed to a method for making a radiation detection system. The method may comprise positioning at least one fiber to receive radiation from a radiation source, forming a surface plasmon support material on portions of the at least one fiber and to receive the radiation from the radiation source that initiates a surface plasmon at an interface between the at least one fiber and the surface plasmon support material, and coupling a probing device to the at least one fiber and to detect the surface plasmon, thereby defining a surface plasmon resonance (SPR) radiation detector.

DETAILED DESCRIPTION

Figure 1:
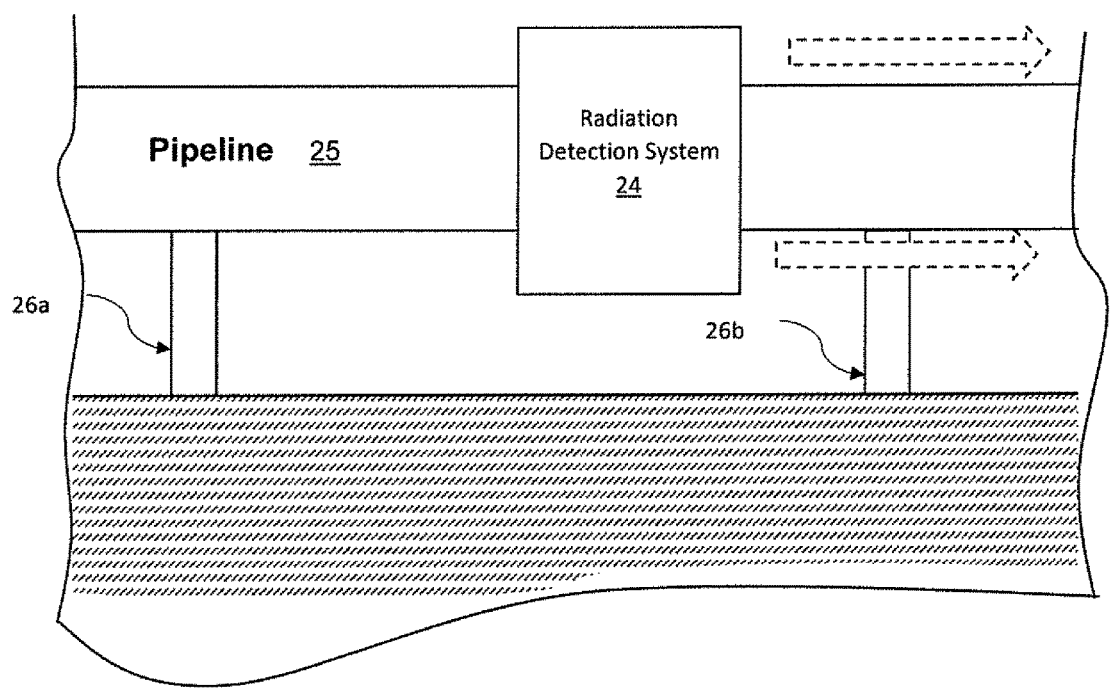
FIG. 1 is a schematic diagram of a hydrocarbon pipeline inspection system with a radiation detection system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these exemplary embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
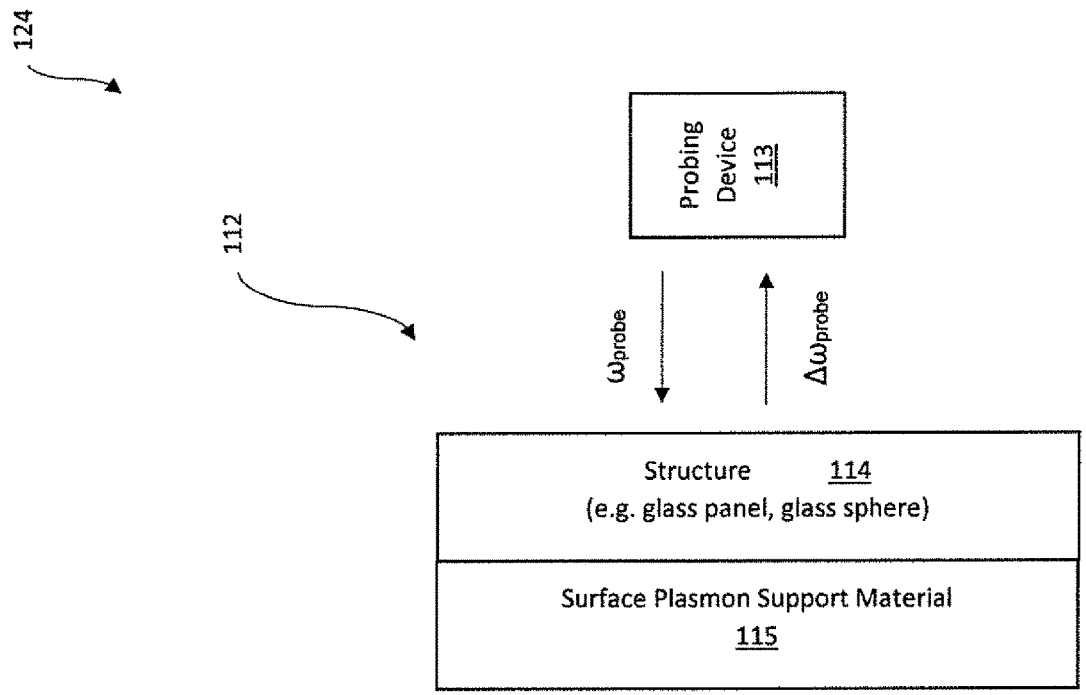
FIG. 2 is a schematic diagram of a first example embodiment of a radiation detection device, according to the present disclosure.
Figure 2:
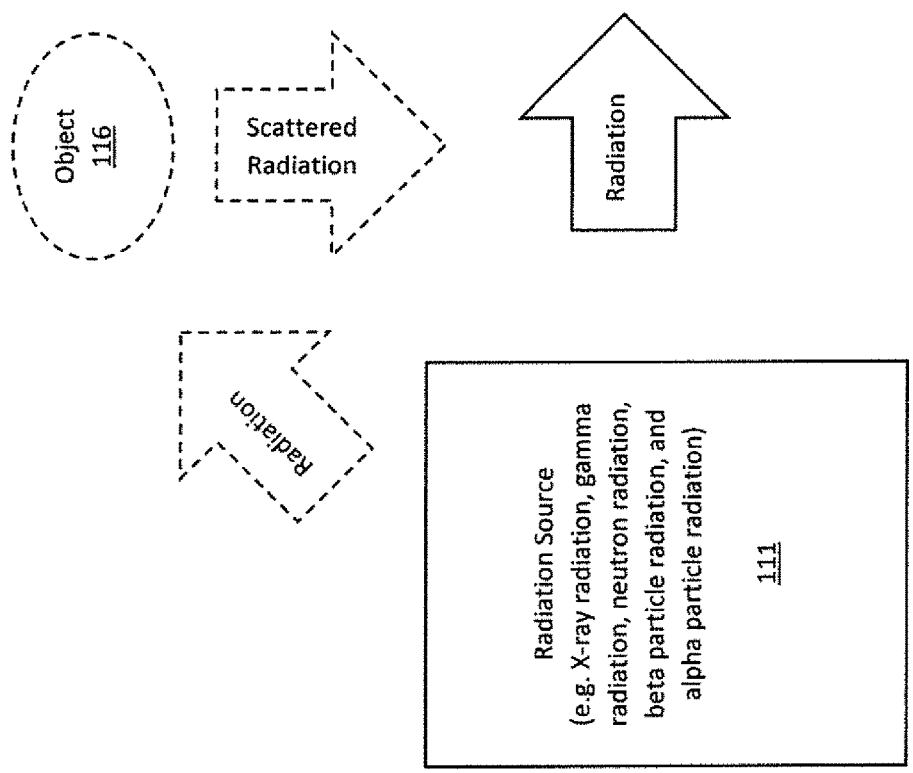
Figure 8:
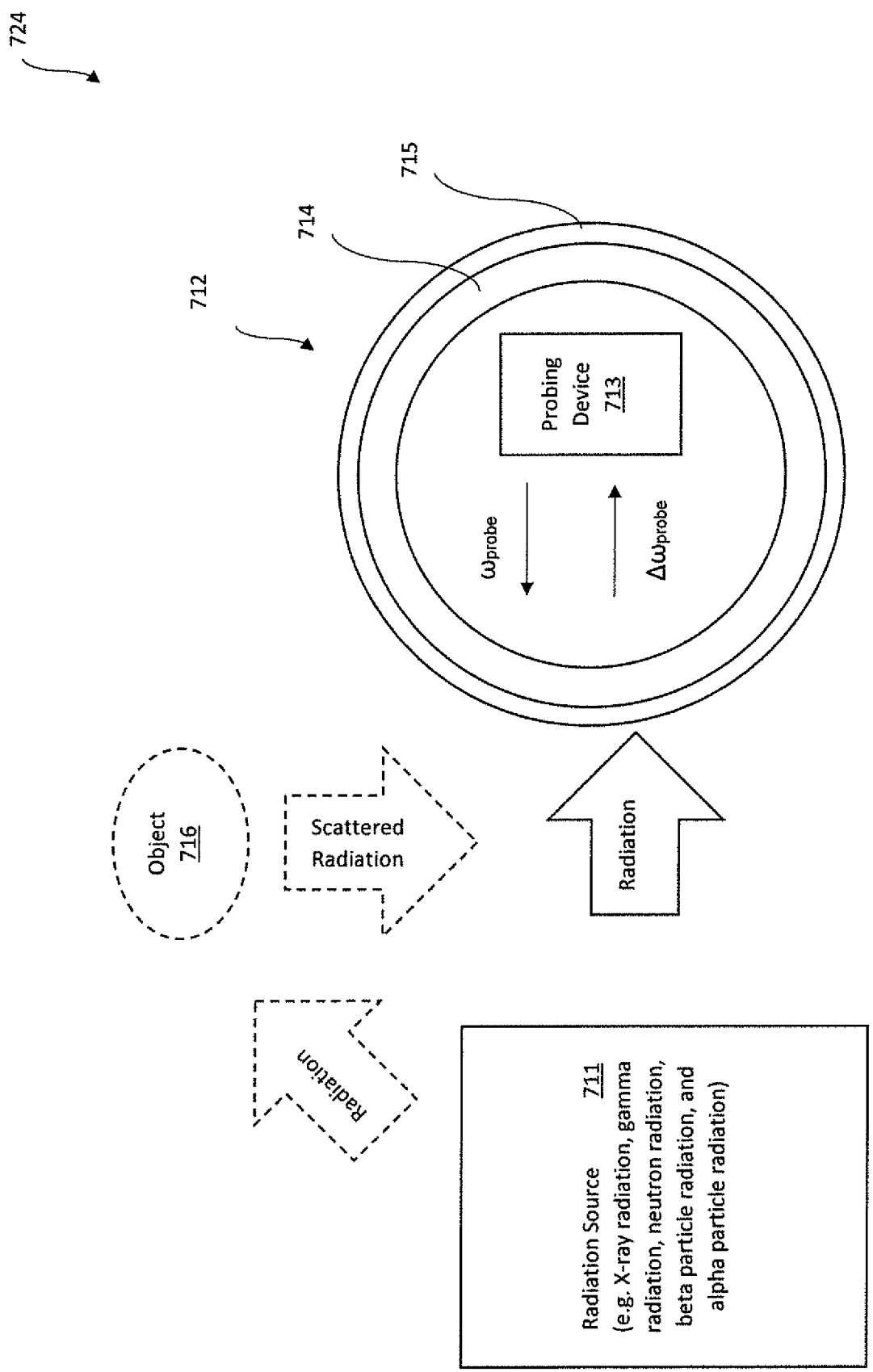
FIG. 8 is a schematic diagram of a sixth embodiment of a radiation detection device, according to the present disclosure.

Referring initially to FIGS. 1-2, a hydrocarbon pipeline inspection system 10 according to the present disclosure is now described. The hydrocarbon pipeline inspection system 10 illustratively includes a pipeline 25 carrying hydrocarbon resources within, and extending above a ground surface 27, and a plurality of supports 26a-26b affixed to the ground surface. As will be appreciated, the pipeline 25 may include a plurality of pipe sections with threaded ends, and the pipeline 25 may extend over long distances, such as, greater than 1 mile. To assure the structural integrity of the pipeline 25, the hydrocarbon pipeline inspection system 10 illustratively includes a radiation detection system 24 for imaging the pipe sections as the radiation detection system moves along the outside of the pipeline 25. The imaging of the pipe sections may allow for detection of hairline fractures, which can predict future leaks. Spectrally, the radiation detection system 24 may operate on radiation comprising at least one of X-ray radiation (as in the illustrated example), gamma radiation, beta particle radiation, proton particle radiation, and alpha particle radiation. Although the illustrated embodiment travels along the outside of the pipeline 25, in other embodiments, the radiation detection system 24 may travel within the pipeline in a pigging device (FIG. 8). It should be appreciated that although the illustrated embodiment may operate within the X-ray spectrum, this is merely one option from the several radiation frequency ranges and particle types noted above.

Moreover, it should be appreciated that the hydrocarbon application is merely exemplary, and that the herein described radiation detection system 24 may be used in many other applications where radiation imaging is needed. Indeed, the radiation detection system 24 may be used for radiation detection in harsh environments (e.g. extreme high/low temperatures, sandy areas, windy applications, and high radiation levels), subsea detection applications, cargo inspections, solar flare detection, space applications, and orbital satellite applications, and security detection applications.

Referring now to FIG. 2, a radiation detection system 124 illustratively comprises a radiation source 111, and a SPR radiation detector 112 comprising a structure 114, and a surface plasmon support material 115 on portions of the structure. The surface plasmon support material 115 is configured to receive radiation from the radiation source 111 that initiates a surface plasmon at an interface between the structure 114 and the surface plasmon support material. The radiation detection system 124 illustratively includes a probing device 113 coupled to the structure 114 and configured to detect the surface plasmon.

Figure 4:
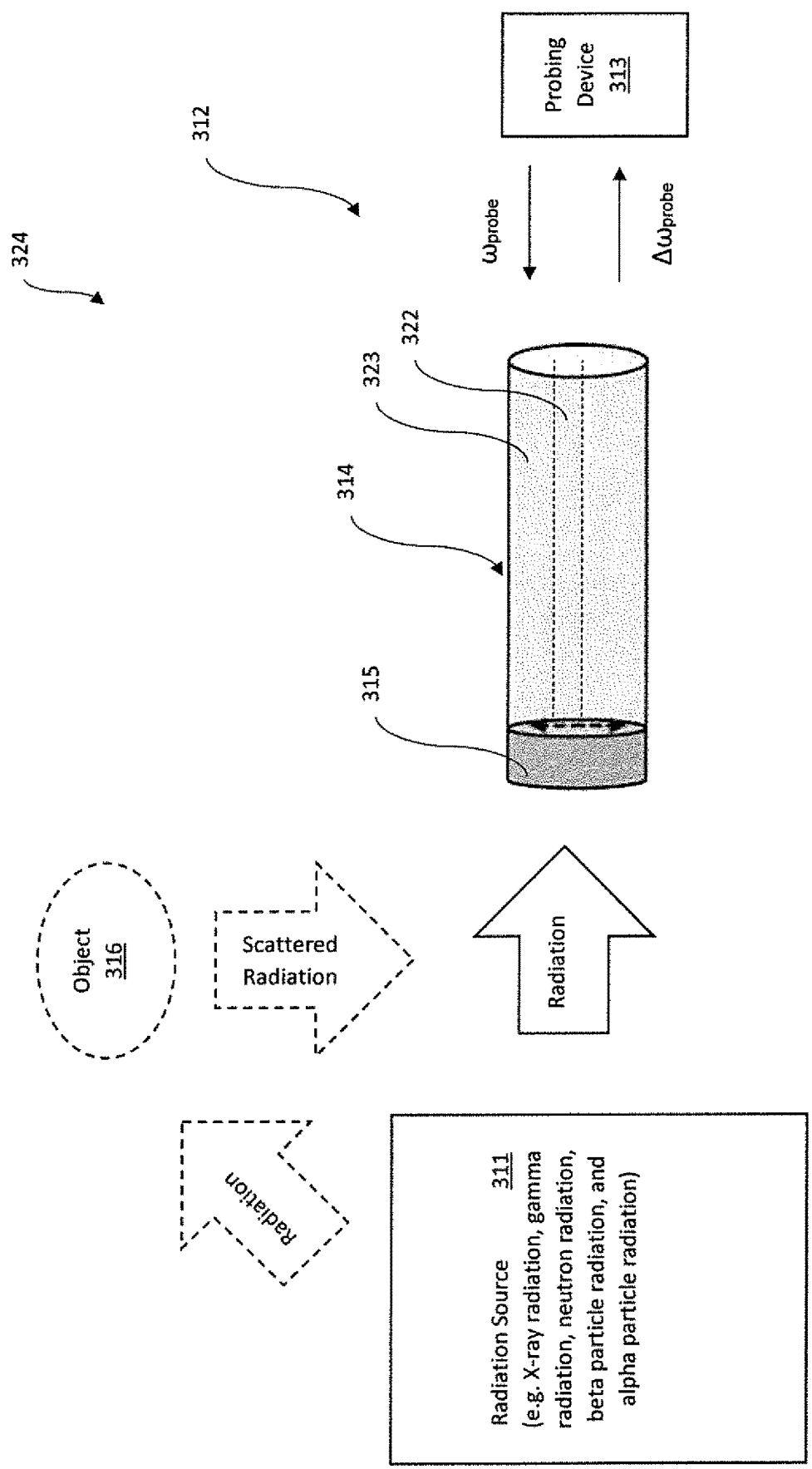
FIG. 4 is a schematic diagram of a third example embodiment of a radiation detection device, according to the present disclosure.
Figure 5:
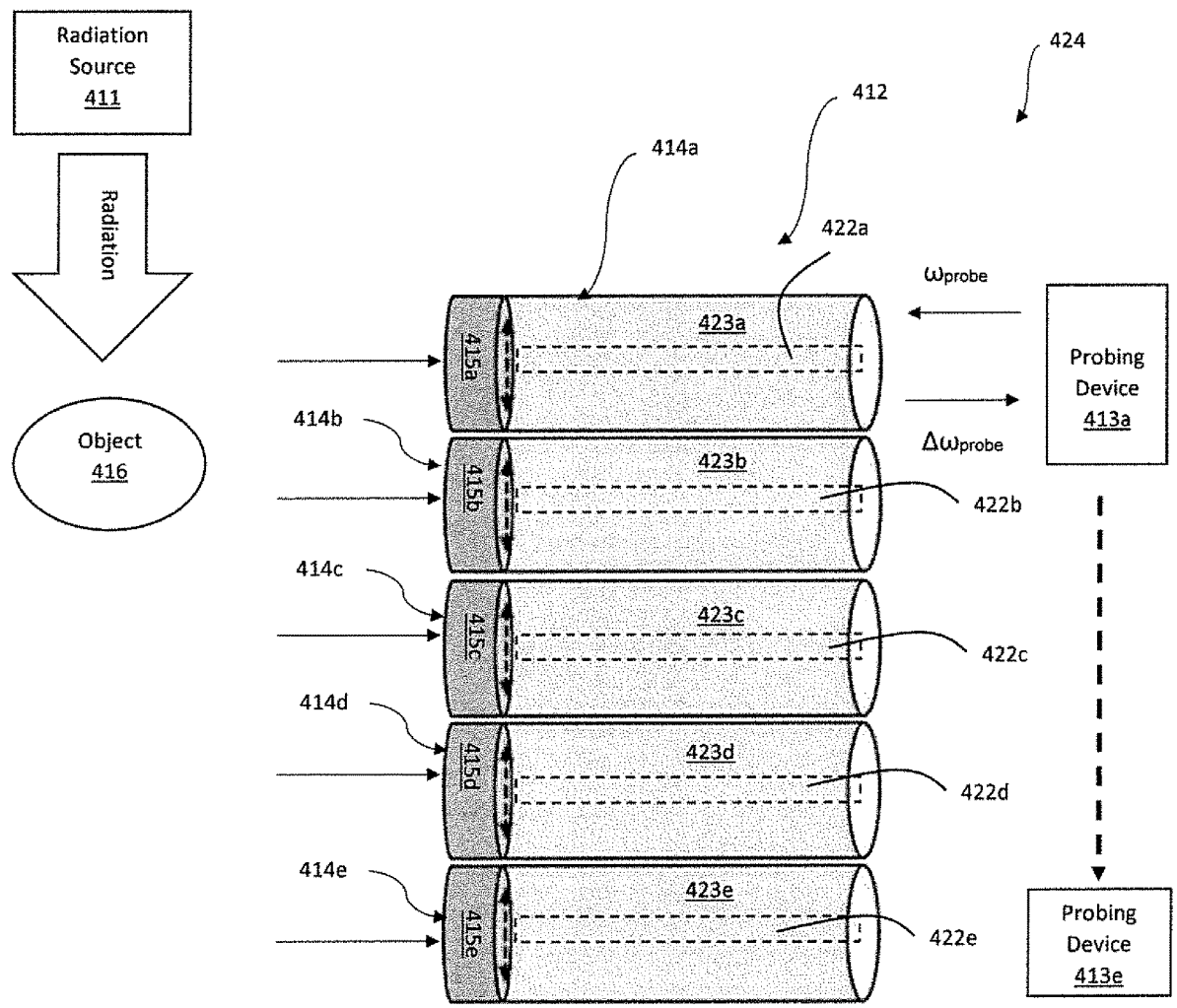
FIG. 5 is a schematic diagram of a fourth example embodiment of the radiation detection device, according to the present disclosure.
Figure 6:
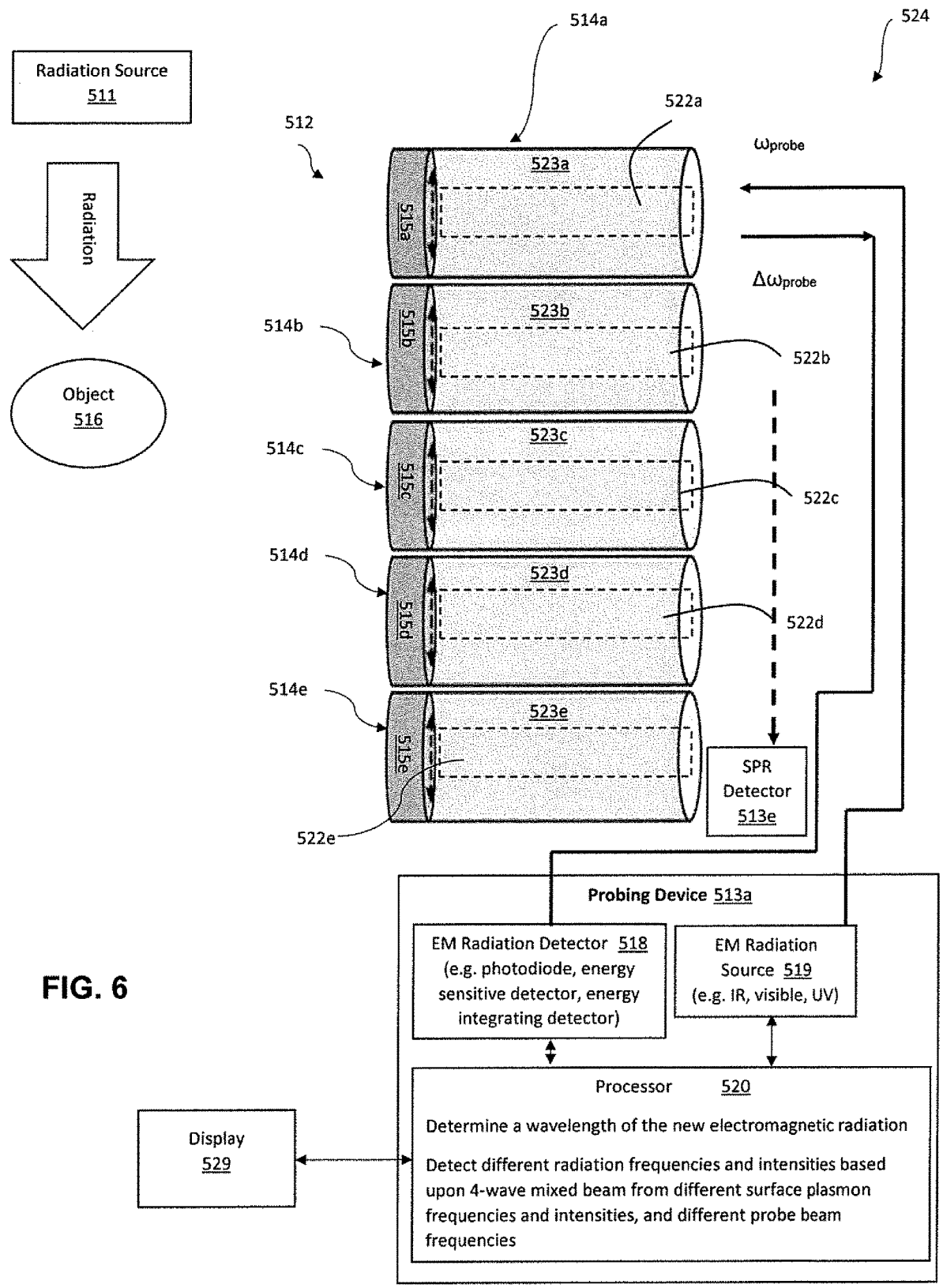
FIG. 6 is a schematic diagram of a fifth example embodiment of the radiation detection system, according to the present disclosure.

For example, the structure 114 may comprise a plurality of structures in some embodiments. (FIGS. 5-6). In some imaging embodiments, the structure 114 comprises one or more fibers. (FIGS. 4-6). For example, the fiber may comprise an optical fiber, or a fiber transmitting non-optical frequencies. For instance, the structure may comprise a sphere (FIG. 3), a linear structure, or a ring (FIG. 8). Indeed, the only requirement for the structure 114 is to transport the probe beam to the interface between the structure and the surface plasmon support material 115. This is because of the action of the X-ray radiation initiating the plasmon, the surface plasmon support structure supporting the surface plasmon, and the structure carrying the probe beam.

Figure 3:
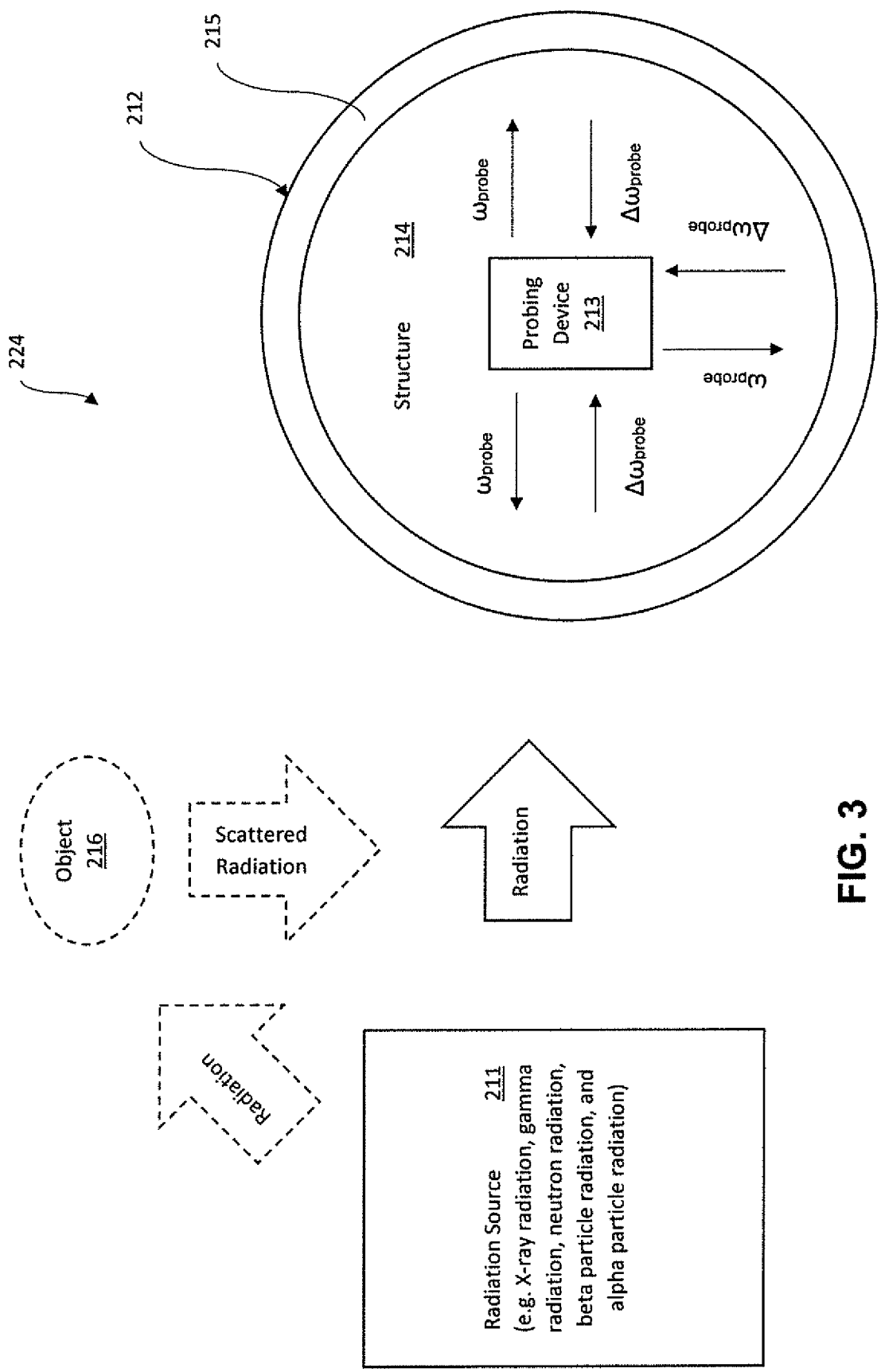
FIG. 3 is a schematic diagram of a second example embodiment of a radiation detection device, according to the present disclosure.

Referring to FIG. 3, another embodiment of the radiation detection system 224 is now described. In this embodiment of the radiation detection system 224, those elements already discussed above with respect to FIG. 2 are incremented by 200 and most require no further discussion herein. This embodiment differs from the previous embodiment in that this radiation detection system 224 illustratively includes the structure comprising a sphere 214. The surface plasmon support material 215 is carried on the external surface of the sphere 214, and the probing device 213 is carried internally. Advantageously, the radiation detection system 224 is capable of detecting radiation omnidirectionally.

Referring to FIG. 4, another embodiment of the radiation detection system 324 is now described. In this embodiment of the radiation detection system 324, those elements already discussed above with respect to FIGS. 2-3 are incremented by 300 and most require no further discussion herein. This embodiment differs from the previous embodiment in that this radiation detection system 324 illustratively includes a radiation source 311, and a SPR radiation detector 312. The SPR radiation detector 312 illustratively includes a single fiber 314, and a surface plasmon support material 315 attached to an end face of the fiber and configured to receive radiation from the radiation source 311.

When the surface plasmon support material 315 receives radiation from the radiation source 311, a surface plasmon is initiated at an interface between the fiber 314 and the surface plasmon support material 315. The SPR radiation detector 312 illustratively includes a probing device 313 coupled to the fiber 314 and configured to detect the surface plasmon.

Each fiber 314 may comprise an optical fiber in some embodiments. As will be appreciated by those skilled in the art, the probing device 313 may utilize non-optical frequencies bands, such as submillimeter radiation (e.g., radiation in the Terahertz frequency spectrum).

As shown with solid lines, the radiation source 311 may comprise an inherently radioactive emitter (e.g. a naturally radioactive material), and the SPR radiation detector 312 is configured to receive radiation from the inherently radioactive emitter. In other applications, such as an application to image an object 316 (indicated with dashed lines), the radiation source 311 comprises a powered radiation emitter. Some embodiments (FIGS. 5-6) where the fiber 314 comprises a plurality thereof may be advantageous for imaging the object 316, permitting imaging of the object 316. The radiation emitter would be configured to irradiate the object 316, with the object absorbing, reflecting, transmitting, and scattering the radiation. The SPR radiation detector 312 is configured to detect the transmitted and scattered radiation.

It also should be appreciated that the fiber 314 structure is merely exemplary. In other embodiments, the SPR radiation detector 312 may alternatively include at least one structure configured to receive radiation from the radiation source 311. (FIG. 2).

Another aspect is directed to a SPR radiation detector 312. The SPR radiation detector 312 includes a fiber 314 to receive radiation from a radiation source 311, and a surface plasmon support material 315 on portions of the fiber and configured to receive the radiation from the radiation source that initiates a surface plasmon at an interface between the fiber and the surface plasmon support material. The SPR radiation detector 312 further comprises a probing device 313 coupled to the fiber 314 and configured to detect the surface plasmon.

Another aspect is directed to a method for making a radiation detection system 324. The method includes positioning at least one fiber 314 to receive radiation from a radiation source 311, and forming a surface plasmon support material 315 on portions of the at least one fiber and to receive radiation from the radiation source that initiates the at least one surface plasmon at an interface between the at least one fiber and the surface plasmon support material. The method includes coupling a probing device 313 to the at least one fiber 314 and to detect the surface plasmon, thereby defining a SPR radiation detector.

In some embodiments, the forming of the surface plasmon support material 315 comprises at least one of physical vapor deposition (PVD), plating, additive manufacturing, and ultrasonic bonding. The PVD process may comprise, for example, evaporation, sputtering, chemical vapor deposition (CVD), etc.

Figure 9:
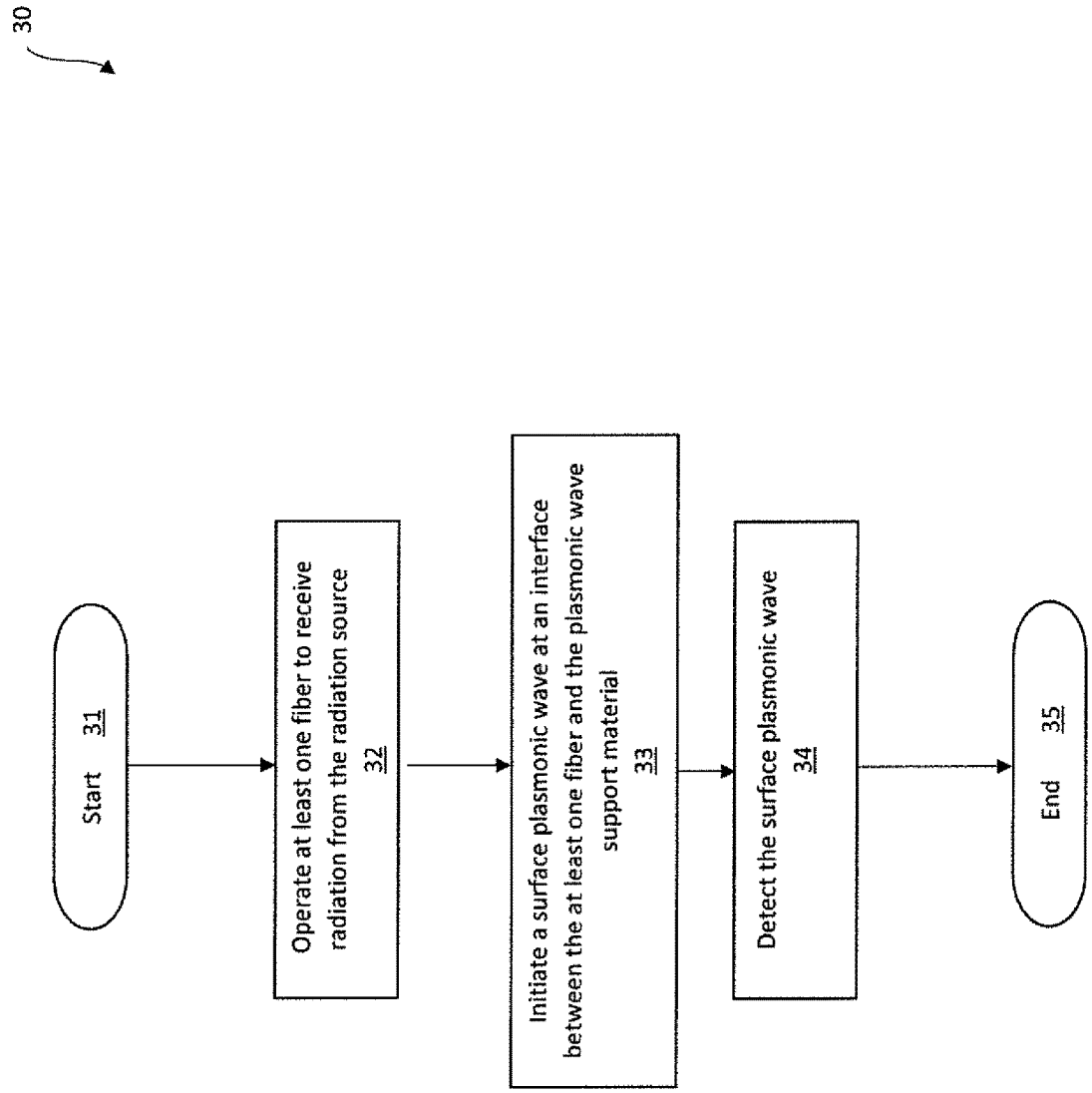
FIG. 9 is a flowchart of a method of operating the radiation detection system, according to the present disclosure.

Referring now briefly and additionally to FIG. 9, a flowchart 30 describes another aspect of the present disclosure. This aspect is directed to a method of operating a radiation detection system 324 comprising a radiation source 311, and a SPR radiation detector 312. The SPR radiation detector 312 includes at least one fiber 314, at least one surface plasmon support material 315 on portions of the at least one fiber, and at least one probing device 313 coupled to the at least one fiber. The method comprises receiving radiation at the surface plasmon support material 315 from the radiation source 311 that initiates a surface plasmon at an interface between the fiber 314 and the surface plasmon support material, and operating the SPR radiation detector 312 to detect the surface plasmon. (Blocks 31-35).

Referring now additionally to FIG. 5, another embodiment of the radiation detection system 424 is now described. In this embodiment of the radiation detection system 424, those elements already discussed above with respect to FIGS. 2-4 are incremented by 400 and most require no further discussion herein. In this illustration, an object 416 is being irradiated, but it should be appreciated that this embodiment could be used in an application where the radiation source 411 comprises an inherently radioactive source and there are no objects between the inherently radioactive source and the SPR radiation detector 412.

The radiation detection system 424 illustratively includes a radiation source 411 (e.g. radioisotope, X-ray tube, synchrotron) configured to emit radiation 417 at the object 416 (e.g. a pipe section in FIG. 1), and a SPR radiation detector 412. The radiation source 411 may be configured to emit at least one of X-ray radiation, gamma radiation, neutron radiation, beta particle radiation, and alpha particle radiation.

The SPR radiation detector 412 illustratively includes a plurality of fibers 414a-414e arranged in a bundle to receive scattered and/or transmitted radiation from the object 416. In the schematic illustrated embodiment, the bundle comprises five fibers 414a-414e, but it should be appreciated that the array can be three-dimensional with a large number of fibers. Each of the fibers 414a-414e illustratively includes a core 422a-422e, and a cladding 423a-423e surrounding the core.

In the illustrated exemplary embodiment, each of the plurality of fibers 414a-414e is a single mode fiber. In other embodiments, each of the plurality of fibers 414a-414e comprises a multi-mode fiber or a photonic crystal fiber.

The SPR radiation detector 412 illustratively includes a surface plasmon support material 415a-415e on portions of the plurality of fibers 414a-414e. In all embodiments, the surface plasmon support material 415a-415e may comprise a material having a non-linear third order susceptibility. Alternatively, the surface plasmon support material 415a-415e may comprise a material having a non-linear second order susceptibility.

In some embodiments, the surface plasmon support material 415a-415e may comprise a transition metal. For example, the surface plasmon support material 415a-415e may include at least one of a transition metal, gold, silver, aluminum, aluminum-silver alloy, doped semiconductors, silicon carbide, diamond, copper, copper-tungsten, and topological insulators (e.g. $Bi_2Se_3$).

In the illustrated embodiment, the surface plasmon support material 415a-415e is formed only on a single end portion/face of each fiber from the plurality of fibers 414a-414e. Of course, in other embodiments (FIG. 7), the surface plasmon support material 415a-415e may extend alternatively or additionally along other portions of the plurality of fibers 414a-414e.

In the illustrated embodiment, each of the plurality of fibers 414a-414e has an end face at an orthogonal angle (or substantially orthogonal angle comprising 90°±5° to a longitudinal axis of a respective fiber. In other embodiments (noted with dashed line in FIG. 7), each of the plurality of fibers 414a-414e has an end face canted at a non-orthogonal angle ($\alpha$) to the longitudinal axis of a respective fiber. Helpfully, this canted cleaved end face may provide for enhanced signal strength of the returned probe beam carrying the signal indicative of the plasmonic wave (or of the surface plasmon wave-altered EM radiation $\omega_{new}$).

The SPR radiation detector 412 illustratively includes a probing device 413a-413e coupled to the plurality of fibers 414a-414e. The probing device 413a-413e is configured to emit source EM radiation $\omega_{probe}$ into the plurality of fibers 414a-414e. The source EM radiation $\omega_{probe}$ may comprise any form of radiation capable of traveling down a fiber with low loss, such as, at least one of visible radiation, UV radiation, and IR radiation. After interacting with the surface plasmon at the interface between the surface plasmon support material 415a-415e and the fiber 414a-414e, the probe beam wavelengths are shifted.

The EM radiation detector (not shown) in the probing device 413a-413e is responsive to the surface plasmon wave-altered EM radiation $\omega_{new}$. In particular, the probing device 413a-413e is configured to determine when SPR is present at the interface between the surface plasmon support material 415a-415e and the end portions of the one or more fibers 414a-414e.

In the illustrated embodiment, there is one probing device 413a-413e for each fiber 414a-414e. In other embodiments, the number of SPR detector circuitries 413a-413e may be reduced using optical multiplexing techniques.

Another aspect is directed to a SPR radiation detector 412. The SPR radiation detector 412 includes a plurality of fibers 414a-414e arranged in a bundle to receive transmitted and/or scattered radiation from an object 416, a surface plasmon support material 415a-415e on portions of the plurality of fibers, and a probing device 413a-413e coupled to the plurality of fibers and responsive to the transmitted and/or scattered radiation.

Referring to FIG. 6, another embodiment of the radiation detection system 524 is now described. In this embodiment of the radiation detection system 524, those elements already discussed above with respect to FIG. 5 are incremented by 500 and most require no further discussion herein. This embodiment differs from the previous embodiment in that this radiation detection system 524 illustratively includes the probing device 513a-513e comprising an EM radiation source 519 configured to emit probe EM radiation $\omega_{probe}$ into the plurality of fibers 514a-514e.

In particular, when the transmitted and/or scattered radiation from the object 516 impacts the surface plasmon support material 515a-515e, surface plasmons are generated at the surface plasmon support material-fiber interface. This action is based upon the electrons liberated from atoms in the surface plasmon support material 515a-515e by the impacting radiation from the object 516. The probe EM radiation $\omega_{probe}$ interacts with the surface plasmons in the surface plasmon support material 515a-515e at the interface with the fiber 514a-514e and is changed during these interactions. In other words, the probe EM radiation $\omega_{probe}$ interacts with the surface plasmons and new EM radiation $\omega_{new}$ is generated having a different wavelength than the probe EM radiation resulting from the interaction via 4-wave or 2-wave mixing at the fiber/surface plasmon support material interface.

Further, the probing device 513a-513e may be configured to detect different radiation frequencies and intensities impacting the surface plasmon support material 515a-515e. This determination is based upon a surface plasmon frequency, its intensity, and the frequency and intensity of a 4-wave or 2-wave mixed beam detected by the probing device 513a-513e.

The probing device 513a-513e illustratively includes an EM radiation detector 518 adjacent to the plurality of fibers 514a-514e and configured to detect the new EM radiation $\omega_{new}$. Additionally, the EM radiation detector 518 comprises one or more photodiode detectors (e.g. arranged in an array). In other embodiments, the EM radiation detector 518 comprises at least one of a photodiode, an energy sensitive detector, and an energy integrating detector. The probing device 513a-513e illustratively includes a processor 520 configured to determine a wavelength shift (i.e. a new wavelength) of the new EM radiation $\omega_{new}$.

For example, each fiber 514a-514e may comprise a glass material, but this material can be varied. In particular, each fiber 514a-514e may comprise at least one from the following: a material transparent in one or more of the frequency ranges of UV, visible, and IR; a glass material; a plastic material; a polymer; a ceramic transparent in one or more of the frequency ranges UV, visible, and IR; silicon carbide; and a crystal (e.g. calcite) transparent in one or more of the frequency ranges UV, visible, and IR. As will be appreciated, the wavelength and intensity of the probe EM radiation 519 and the wavelength and intensity of the surface plasmon wave-altered EM radiation $\omega_{new}$ may change based upon the inherent optical properties of the fiber 514a-514e and surface plasmon support materials, requiring an alteration in the processor 520 parameters.

The radiation detection system 524 illustratively includes a display 529 coupled to the processor 520. The processor is configured to arrange outputs from the plurality of fibers 514a-514e into a photon-sensitive array to define a pixelated image for presentation on the display 529. The plurality of fibers 514a-514e generates a plurality of photon signals defining the pixelated image. Advantageously, the radiation detection system 512 may be fit into a portable package, as compared to typical scintillator approaches. For example, the bundle of fibers 514a-514e may be arranged into a 4,000×4,000 square imaging array. In an example embodiment, each fiber 514a-514e has a pixel width of 10 μm (single mode fiber example) and the imaging array has a size of 40 cm×40 cm. In some embodiments, the radiation detection system 524 illustratively includes a memory configured to store the image. Also, in this embodiment, each of the plurality of fibers 514a-514e may be a multi-mode fiber or each may be a single mode fiber.

Figure 7:
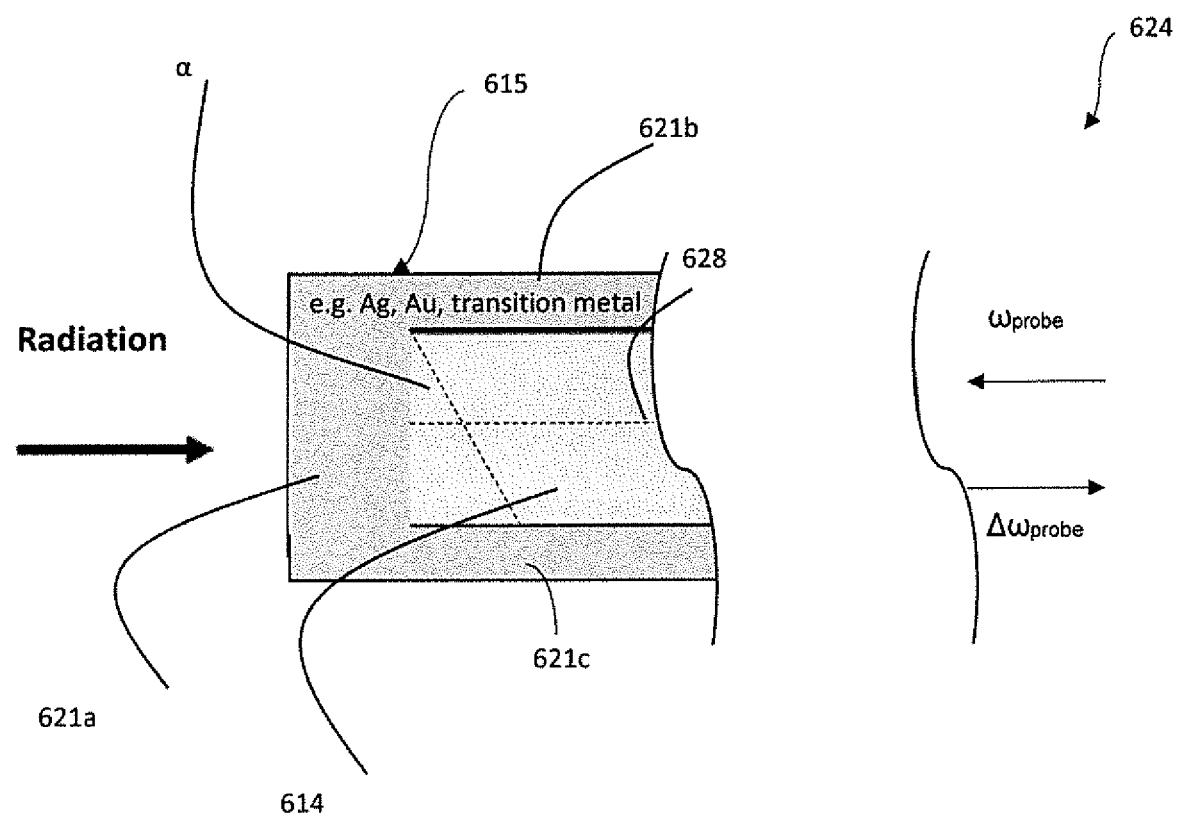
FIG. 7 a schematic cross-sectional view of another embodiment of the fiber in the radiation detection device, according to the present disclosure.

Referring now additionally to FIG. 7, another embodiment of the radiation detection system 624 is now described. In this embodiment of the radiation detection system 624, those elements already discussed above with respect to FIGS. 5-6 are incremented by 600 and most require no further discussion herein. This embodiment differs from the previous embodiment in that this radiation detection system 624 has the surface plasmon support material 615 comprising additional layers 621a-621c further extending on sides of the plurality of fibers 614. Also, the additional layers 621a-621c of the surface plasmon support material 615 may be on sides substantially parallel (±10° of parallel) to a longitudinal axis 628 of the at least one fiber.

In an alternate embodiment, the additional layers 621a-621c of the surface plasmon support material 615 may comprise materials having efficient absorption at different x-ray wavelengths. Each layer thickness is determined by a trade-off between radiation absorption efficiency and the ability of the surface plasmonic electric field in each layer to penetrate the other layers to interact with the fiber optic electric field and create a surface plasmon wave in the surface plasmon support layer. For example, erbium absorbs efficiently at approximately 57 keV, while ytterbium absorbs efficiently at approximately 61 keV. Layering the materials with the ytterbium situated between the fiber optic material and the erbium layer enables the 57 keV x-rays to be absorbed in the erbium and potentially creating a surface plasmon wave if the surface plasmon wave can penetrate all the way through the ytterbium layer and interact with the dielectric material of the fiber optic. The higher energy x-rays travel through the erbium and are absorbed in the ytterbium, creating a surface plasmon wave at the ytterbium/fiber interface. Making the ytterbium layer thinner than the penetration depth of the erbium surface plasmon field, may enable existence of the erbium surface plasmon wave in the erbium layer and be visible by the probe beam at the fiber/plasmon support material interface.

Referring now additionally to FIG. 8, another embodiment of the radiation detection system 724 is now described. In this embodiment of the radiation detection system 724, those elements already discussed above with respect to FIGS. 5-7 are incremented by 700 and most require no further discussion herein. This embodiment differs from the previous embodiment in that this radiation detection system 724 has the structure comprising a ring-shaped structure 714, and the surface plasmon support material 715 is carried on an outer radial surface of the ring-shaped structure. Indeed, the shape of the radiation detector system would be helpful in pigging device applications, for example. In some embodiments, the surface plasmon support material 715 may be carried additionally or alternatively on an inner radial surface of the ring-shaped structure 714. Is should be appreciated that the circle-shaped ring is merely exemplary, and other shapes are possible, such as oval shapes, rectangle-shapes, etc.

Advantageously, the radiation detection system 124, 224, 324, 424, 524, 624, 724 may provide an approach to the problems of prior art radiation detectors. Firstly, the SPR radiation detector 112, 212, 312, 412, 512, 712 has lower manufacturing costs and reduced size weight and power (SWaP). Moreover, since the SPR radiation detector 112, 212, 312, 412, 512, 712 is mechanically robust, it has a wider field deployability. In short, this radiation detection system 124, 224, 324, 424, 524, 624, 724 is readily portable.

Moreover, the disclosed embodiments (i.e. the pixelated imaging embodiments of FIGS. 5-6) may improve on the coarse resolution of prior art approaches. In those approaches, the X-ray detector active pixel size may be 50 microns or larger. Positively, the SPR radiation detector 412, 512 may have an active pixel size in the range of 1-5 microns for each fiber 414A-414e, 514a-514e in the bundle. Yet further, since the SPR radiation detector 112, 212, 312, 412, 512, 712 down-converts the received radiation to UV, visible, or IR EM radiation, the SPR radiation detector 112, 212, 312, 412, 512, 712 may utilize less expensive detection equipment than the direct-conversion radiation detector approaches and may be simpler to fabricate than the scintillator-based detectors.

Helpfully, the radiation detection system 124, 224, 324, 424, 524, 624, 724 may provide improved radiation detection sensitivity. Indeed, the sensitivity may be on the order of a solid state single-photon-counting semiconductor device.

Also, the radiation detection system 124, 224, 324, 424, 524, 624, 724 may be structured for enhanced durability. In particular, the probing device 113, 213, 313, 413a-413e, 513a-513e, 513a-513e contains the only electronic circuitry for the SPR radiation detector 112, 212, 312, 412, 512, 712, and these components can be readily shielded from radiation damage by remoting the electronic circuitry out of the direct radiation bombardment path. Moreover, due to the low loss quality of the plurality of fibers 314, 414a-414e, 514a-514e, the probing signals can be remoted over long distances. Of course, this is in contrast to typical solid state approaches where the read circuitry may be integrated with the sensing components, putting them in line-of-sight of bombardment by the radiation source, preventing them from being shielded effectively. Indeed, in typical scintillator approaches, the electronic circuitry is placed directly behind the scintillator and impacted by high energy radiation that is not absorbed by the scintillator.

Other features relating to radiation detection systems are disclosed in co-pending application: titled "RADIATION DETECTION SYSTEM WITH SURFACE PLASMON RESONANCE DETECTION AND RELATED METHODS," U.S. patent application Ser. No. 16/444,063, filed Jun. 18, 2019, now U.S. Patent Publication No. 2020/0400842, published Dec. 24, 2020, which is incorporated herein by reference in its entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A radiation detection system comprising:
 a radiation source; and
 a surface plasmon resonance (SPR) radiation detector comprising
  at least one fiber,
  a surface plasmon support material on portions of said at least one fiber and configured to receive radiation from said radiation source that initiates a surface plasmon at an interface between said at least one fiber and said surface plasmon support material, and
  a probing device coupled to said at least one fiber and configured to detect the surface plasmon, said probing device comprising
   a probe electromagnetic (EM) radiation source configured to emit probe EM radiation into said at least one fiber, the probe EM radiation interacting with the surface plasmon and generating new EM radiation having a different wavelength than the probe EM radiation resulting from the interaction, and
   an EM radiation detector coupled to said at least one fiber and configured to detect the new EM radiation.

2. The radiation detection system of claim 1 wherein said probing device comprises a processor configured to determine a wavelength of the new EM radiation.

3. The radiation detection system of claim 1 wherein said probe EM radiation source comprises at least one of a visible EM radiation source, an ultraviolet (UV) EM radiation source, and an infrared (IR) EM radiation source.

4. The radiation detection system of claim 1 wherein said EM radiation detector comprises at least one photodiode.

5. The radiation detection system of claim 1 wherein said EM radiation detector comprises at least one energy sensitive detector.

6. The radiation detection system of claim 1 wherein said EM radiation detector comprises at least one energy integrating detector.

7. The radiation detection system of claim 1 wherein said at least one fiber comprises a plurality thereof arranged in a bundle; and wherein said probing device comprises a processor configured to generate a pixelated image based upon surface plasmon detection signals, the plurality of fibers generating a plurality of signals, a respective signal from each fiber defining a pixel in the pixelated image.

8. The radiation detection system of claim 1 wherein said surface plasmon support material comprises at least one transition metal.

9. The radiation detection system of claim 1 wherein said surface plasmon support material comprises at least one of gold, silver, aluminum, aluminum-silver alloy, doped semiconductors, silicon carbide, diamond, copper, copper-tungsten, and topological insulators.

10. The radiation detection system of claim 1 wherein said surface plasmon support material is on a single end portion of said at least one fiber.

11. The radiation detection system of claim 1 wherein said at least one fiber has an end face canted at a non-orthogonal angle to a longitudinal axis of said at least one fiber.

12. The radiation detection system of claim 1 wherein said at least one fiber has an end face at an orthogonal angle to a longitudinal axis of said at least one fiber.

13. The radiation detection system of claim 1 wherein said surface plasmon support material is on sides substantially parallel to a longitudinal axis of said at least one fiber; and wherein said surface plasmon support material comprises a plurality of different material layers, each different material layer to absorb radiation at a different energy level.

14. The radiation detection system of claim 1 wherein said at least one fiber comprises at least one of a multi-mode fiber, a single mode fiber, and a photonic crystal fiber.

15. The radiation detection system of claim 1 wherein said at least one fiber comprises a material transparent to at least one of UV, visible, and IR radiation.

16. The radiation detection system of claim 15 wherein said material comprises glass, plastic, polymer, ceramic, silicon carbide, and crystals.

17. The radiation detection system of claim 1 wherein said radiation source is configured to emit at least one of X-ray radiation, gamma radiation, neutron radiation, beta particle radiation, proton particle radiation, and alpha particle radiation.

18. The radiation detection system of claim 1 wherein said probing device is configured to detect different radiation frequencies and intensities based upon a 4-wave mixed beam resulting from different surface plasmon frequencies and intensities and different probe beam frequencies.

19. The radiation detection system of claim 1 wherein said probing device is configured to detect different radiation frequencies and intensities based upon a 2-wave mixed beam resulting from different surface plasmon frequencies and intensities and different probe beam frequencies.

20. The radiation detection system of claim 1 wherein said radiation source comprises a radiation emitter; wherein said radiation emitter is configured to irradiate an object; wherein the object transmits or scatters the radiation; and wherein said SPR radiation detector is configured to detect transmitted or scattered radiation.

21. The radiation detection system of claim 1 wherein said surface plasmon support material comprises a plurality of different material layers, each different material layer to absorb radiation at a different energy level.

22. A surface plasmon resonance (SPR) radiation detector comprising:
 at least one fiber;
 a surface plasmon support material on portions of said at least one fiber;
 said surface plasmon support material configured to receive radiation from a radiation source that initiates a surface plasmon at an interface between said at least one fiber and said surface plasmon support material; and
 a probing device coupled to said at least one fiber and configured to detect the surface plasmon, said probing device comprising
  a probe electromagnetic (EM) radiation source configured to emit probe EM radiation into said at least one fiber, the probe EM radiation interacting with the surface plasmon and generating new EM radiation having a different wavelength than the probe EM radiation resulting from the interaction, and an EM radiation detector coupled to said at least one fiber and configured to detect the new EM radiation.

23. The SPR radiation detector of claim 22 wherein said probing device comprises a processor configured to determine a new wavelength of the new EM radiation.

24. The SPR radiation detector of claim 22 wherein said probe EM radiation source comprises at least one of a visible EM radiation source, an ultraviolet (UV) EM radiation source, and an infrared (IR) EM radiation source.

25. The SPR radiation detector of claim 22 wherein said EM radiation detector comprises at least one photodiode.

26. The SPR radiation detector of claim 22 wherein said EM radiation detector comprises at least one energy sensitive detector having at least one pixel.

27. The SPR radiation detector of claim 22 wherein said EM radiation detector comprises at least one energy integrating detector having at least one pixel.

28. The SPR radiation detector of claim 22 wherein said surface plasmon support material comprises at least one transition metal.

29. The SPR radiation detector of claim 22 wherein said surface plasmon support material comprises at least one of gold, silver, aluminum, aluminum-silver alloy, doped semiconductors, silicon carbide, diamond, copper, copper-tungsten, and topological insulators.

30. The SPR radiation detector of claim 22 wherein said surface plasmon support material is on a single end portion of said at least one fiber.

31. The SPR radiation detector of claim 22 wherein said surface plasmon support material is on sides substantially parallel to a longitudinal axis of said at least one fiber; and wherein said surface plasmon support material comprises a plurality of different material layers, each different material layer to absorb radiation at a different energy level.

32. The SPR radiation detector of claim 22 wherein said surface plasmon support material comprises a plurality of different material layers, each different material layer to absorb radiation at a different energy level.

33. A method of operating a radiation detection system comprising a radiation source, and a surface plasmon resonance (SPR) radiation detector, the SPR radiation detector comprising at least one fiber, a surface plasmon support material on portions of the at least one fiber, and a probing device coupled to the at least one fiber, the method comprising:

receiving radiation at the surface plasmon support material from the radiation source that initiates a surface plasmon at an interface between the at least one fiber and the surface plasmon support material; and operating the SPR radiation detector to detect the surface plasmon by at least operating a probe electromagnetic (EM) radiation source of the probing device to emit probe EM radiation into the at least one fiber, the probe EM radiation interacting with the surface plasmon and generating new EM radiation having a different wavelength than the probe EM radiation resulting from the interaction, and operating an EM radiation detector of the probing device coupled to the at least one fiber, the EM radiation detector to detect the new EM radiation.

34. The method of claim 33 further comprising operating a detector and a processor of the probing device to determine a new wavelength of the new EM radiation.

35. The method of claim 33 wherein the surface plasmon support material comprises a plurality of different material layers, each different material layer to absorb radiation at a different energy level.

36. A method for making a radiation detection system comprising:

positioning at least one fiber to receive radiation from a radiation source;

forming a surface plasmon support material on portions of the at least one fiber and to receive the radiation from the radiation source that initiates a surface plasmon at an interface between the at least one fiber and the surface plasmon support material; and coupling a probing device to the at least one fiber and to detect the surface plasmon, thereby defining a surface plasmon resonance (SPR) radiation detector, the probing device comprising a probe electromagnetic (EM) radiation source configured to emit probe EM radiation into the at least one fiber, the probe EM radiation interacting with the surface plasmon and generating new EM radiation having a different wavelength than the probe EM radiation resulting from the interaction, and an EM radiation detector coupled to the at least one fiber and configured to detect the new EM radiation.

37. The method of claim 36 wherein the probing device comprises a processor configured to determine a wavelength of the new EM radiation.

38. The method of claim 36 wherein the probe EM radiation source comprises at least one of a visible EM radiation source, an ultraviolet (UV) EM radiation source, and an infrared (IR) EM radiation source.

39. The method of claim 36 wherein the forming of the surface plasmon support material comprises at least one of physical vapor deposition (PVD), chemical vapor deposition (CVD), plating, additive manufacturing, and ultrasonic bonding.

40. The method of claim 36 wherein the surface plasmon support material comprises a plurality of different material layers, each different material layer to absorb radiation at a different energy level.

* * * * *